(12) United States Patent
Lee et al.

(10) Patent No.: US 6,909,705 B1
(45) Date of Patent: Jun. 21, 2005

(54) INTEGRATING WIRELESS LOCAL LOOP NETWORKS WITH CELLULAR NETWORKS

(75) Inventors: William C. Y. Lee, Danville, CA (US); Jau Young Lee, Pleasanton, CA (US)

(73) Assignee: Cello Partnership, Bedminster, NJ (US)

( * ) Notice: Subject to any disclaimer, the term of this patent is extended or adjusted under 35 U.S.C. 154(b) by 895 days.

(21) Appl. No.: 09/705,556

(22) Filed: Nov. 2, 2000

Related U.S. Application Data

(60) Provisional application No. 60/163,139, filed on Nov. 2, 1999.

(51) Int. Cl.[7] ............................................... H04Q 7/20
(52) U.S. Cl. .................... 370/338; 370/465; 455/552.1; 455/554.2
(58) Field of Search ............................... 370/328, 329, 370/331, 338, 465; 455/552.1, 553.1, 554.2, 556.1, 556.2

(56) References Cited

U.S. PATENT DOCUMENTS

| | | | | |
|---|---|---|---|---|
| 5,842,122 A | * | 11/1998 | Schellinger et al. | ......... 455/403 |
| 5,878,344 A | * | 3/1999 | Zicker | ...................... 455/426.1 |
| 5,887,256 A | * | 3/1999 | Lu et al. | ................... 455/426.1 |
| 5,907,541 A | * | 5/1999 | Fairholm et al. | ............ 370/316 |
| 6,141,547 A | * | 10/2000 | Rousseau et al. | ......... 455/426.1 |
| 6,459,688 B1 | * | 10/2002 | Bursztejn et al. | ........... 370/329 |
| 6,526,034 B1 | * | 2/2003 | Gorsuch | ...................... 370/338 |
| 6,546,253 B1 | * | 4/2003 | Chow et al. | ................. 455/439 |
| 6,643,512 B1 | * | 11/2003 | Ramaswamy | ............... 455/437 |
| 6,650,871 B1 | * | 11/2003 | Cannon et al. | ............. 455/41.2 |
| 6,683,886 B1 | * | 1/2004 | van der Tuijn et al. | ..... 370/458 |
| 6,697,638 B1 | * | 2/2004 | Larsson et al. | ........... 455/553.1 |
| 6,711,146 B2 | * | 3/2004 | Yegoshin | ..................... 370/338 |

* cited by examiner

*Primary Examiner*—Min Jung
(74) *Attorney, Agent, or Firm*—Gates & Cooper LLP

(57) ABSTRACT

Bluetooth networks, also known as wireless local loop, are integrated with cellular networks, so that the two networks can inter-operate with devices enabled for both types of networks.

20 Claims, 2 Drawing Sheets

INTEGRATING WIRELESS LOCAL LOOP NETWORKS WITH CELLULAR NETWORKS

CROSS REFERENCE TO RELATED APPLICATION

This application claims priority under 35 U.S.C. §119(e) to U.S. Provisional Patent Application No. 60/163,139, filed Nov. 2, 1999, by William C. Y. Lee and Jau Y. Lee, and entitled "INTEGRATING BLUETOOTH WITH CELLULAR SERVICE," which application is incorporated by reference herein.

BACKGROUND OF THE INVENTION

1. Field of the Invention

The present invention relates to cellular telephone systems, and, in particular, to the use of a wireless local loop network with a cellular telephone system.

2. Description of the Related Art

Bluetooth is a wireless telecommunications technology that defines a so-called "wireless local loop" (WLL) or wireless personal area networks (PAN). Bluetooth is being developed by the Bluetooth Special Interest Group, (www.bluetooth.com), which was founded in 1998 by Ericsson, IBM, Intel, Nokia and Toshiba. Bluetooth is an open standard for short-range wireless transmission of digital voice and data between mobile devices, such as laptops, personal digital assistants (PDAs), phones, etc., and desktop devices. At present, there are more than 900 companies that are members of the Bluetooth Special Interest Group, and the general belief is that, in the near future, most telecommunications devices will have Bluetooth technology embedded within them.

Currently, the Bluetooth standard is gaining momentum in the telecommunications industry, not just for WLL, but for other wireless applications as well. However, at present, there are no clearly defined applications for deploying Bluetooth. Nonetheless, the telecommunications industry believes that Bluetooth will extend Internet Protocol (IP) networks to more users and more applications.

Each Bluetooth-enabled device includes a radio and operates in a globally-available frequency band, thereby ensuring communication compatibility worldwide. The Bluetooth standard supports both point-to-point and point-to-multipoint connections. In addition, the Bluetooth standard defines two power levels: a lower power level that covers the shorter personal area, e.g., within a room, and a higher power level that can cover a medium range, e.g., within a building. Software controls and identity coding built into each Bluetooth-enabled device ensure that only those units preset by their owners can communicate with each other.

Bluetooth has certain advantages over cellular networks. For example, it is easier to deploy Bluetooth networks than cellular networks. In addition, Bluetooth networks are more cost-effective in providing WLL services than cellular networks. From a consumer's point of view, the battery life of a mobile phone used in cellular network is less than a cordless phone used in a Bluetooth network. From a service provider's point of view, the cost of supporting mobile phones within buildings is more costly than operating Bluetooth networks.

Nonetheless, there are certain synergies between cellular networks and Bluetooth networks. For example, if a mobile phone can use both types of networks, substantial cost savings are available to the service provider. Moreover, the consumer benefits from the convenience of using only one phone, yet paying less for WLL service than for cellular service. Consequently, there is a need, however, for a system that integrates Bluetooth technology with cellular telephony, so that voice and data can be relayed effectively among these different networks.

SUMMARY OF THE INVENTION

To overcome the limitations in the prior art described above, and to overcome other limitations that will become apparent upon reading and understanding the present specification, the present invention discloses a communications system that integrates a cellular network with a wireless local loop and includes devices enabled to operate on both networks.

BRIEF DESCRIPTION OF THE DRAWINGS

Referring now to the drawing in which like reference numbers represent corresponding parts throughout.

DETAILED DESCRIPTION OF THE PREFERRED EMBODIMENT

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Overview

The present invention integrates Bluetooth networks, also known as wireless local loop networks, with cellular networks, so that the two networks can inter-operate with devices enabled for both types of networks.

Operating Environment

Figure 1:
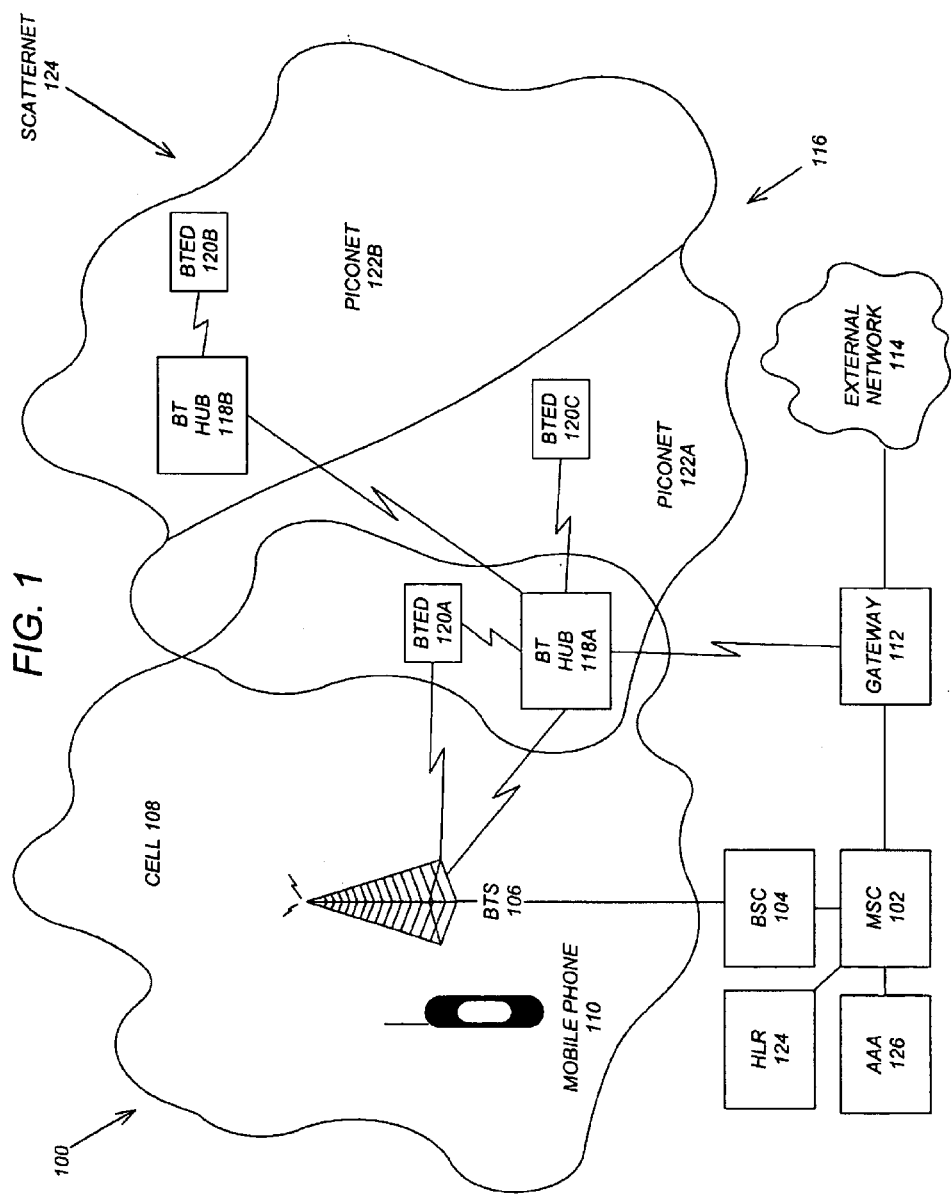
FIG. 1 illustrates a wireless network according to the preferred embodiment of the present invention.

FIG. 1 illustrates a wireless network 100 according to the preferred embodiment of the present invention. The network 100 comprises a cellular telephone system that includes at least one MSC (Mobile Switching Center) 102, at least one BSC (Base Station Controller) 104, and at least one BTS (Base Transceiver Station) 106 (and associated antennae). The limits of radio frequency (RF) signal coverage from the BTS 106 define a perimeter of the associated cell site 108, which is often irregular in shape due to the shape of terrain and the presence of buildings and other structures. The BTS 106 may include omni-directional or directional antennae, wherein the directional antennae can use fixed beam techniques or beam forming techniques to define sectors within the cell site 108 to increase channel efficiency by permitting "soft" handoffs (SHOs) (i.e., no channel changes) for mobile transceivers 110 (e.g., mobile phones) that traverse between sectors, rather than the "hard" handoffs (HHOs) (i.e., channel changes) that occur when the mobile transceivers 110 traverse between cell sizes 108.

In the present invention, the MSC 102 interfaces via a gateway 112 both to one or more external networks 114 and/or a Bluetooth network 116. The external networks 114 may comprise, for example, the Internet, and/or an Intranet, and/or a Public Switched Telephone Network (PSTN), and/or a Public Land Mobile Network (PLMN).

In the Bluetooth network 116, a 'master' device, also known herein as a Bluetooth-enabled Hub (BT Hub) 118A–B, can communicate wirelessly with a number of 'slave' devices, also known herein as Bluetooth-enabled devices (BTEDs) 120A–C within a 'piconet' 122A–B. Moreover, the BT Hubs 118A–B communicate between themselves across piconets 122A–B. Several of these piconets 122A–B can be established and linked together via the BT Hubs 118A–B in ad hoc 'scatternets' 124 to allow communication among continually flexible configurations. All devices 118A–B, 120A–C in the same piconet 122A–B are known as 'nodes.' The topology of the Bluetooth network 116 can best be described as a flexible, multiple piconet 122A–B structure.

In the preferred embodiment of the present invention, a BT Hub 118A and/or a BTED 120A may also be cellular-enabled, so that they can communicate with the BTS 106, in a manner similar to any other mobile transceiver 110. An alternative embodiment is that the mobile transceivers 110 are Bluetooth-enabled, so that they can communicate with the BT Hubs 118A–B or other BTEDs 120A–C, in a manner identical to any other Bluetooth device 118, 120. The goal is to allow devices that are both cellular-enabled and Bluetooth-enabled to use either the cellular network 100 or the Bluetooth network 116, depending on the circumstances. Moreover, data may "ricochet" within the network 116, such that devices 118, 120 that are dual-enabled can relay data for devices 118, 120 that are not dual-enabled.

In the preferred embodiment shown in FIG. 1, the BT Hub 118A and/or the BTED 120A reside within the RF coverage area of both the cell site 108 and the piconet 122A. However, the RF coverage areas of the cell site 108 and the piconet 122A are not co-extensive, the BT Hub 118A and the BTED 120A are both mobile, and thus the BT Hub 118A and/or the BTED 120A may traverse outside the RF coverage areas of the cell site 108 and/or the piconet 122A. Moreover, the BTS 106 may incorporate a so-called "smart antenna" that uses beam forming techniques to target RF signals at the BT Hub 118A and/or the BTED 120A, which results in a dynamically changing RF coverage area.

During operation, the BT Hubs 118 and BTEDs 120 form a logical connection, virtual local area network (LAN). Preferably, the Bluetooth network 116 is configured as a virtual IP network in any topology. During operations, packets may "ricochet" among several Blueteeth nodes 118, 120, to/from the gateway 112, to/from the cellular network 100, and to/from the IP network 114.

Preferably, the cellular network 100 provides the administrative infrastructure and intelligence for the Bluetooth network 116, e.g., for authorization, authentication, registration, billing, profiling, roaming, etc. For example, the cellular network 100 may support access to and from the Bluetooth network 116 using the directory services of a Home Location Register (HLR) 124, and the authorization, accounting and authentication (AAA) services of an AAA Server 126. In this scenario, the gateway 112 provides access to the AAA Server 126 from the Bluetooth network 116 to determine which devices 118, 120 are entitled to access the cellular network 100 and/or the Bluetooth network 116, and to the HLR 124 of the cellular network 100 to determine how to transfer packets within and between the two networks 100 and 116.

Similarly, the Bluetooth network 116 may support access to the cellular network 100 using the BT Hubs 118A–B, which act as Domain Name Servers (DNS) and/or Authorization, Accounting and Authentication (AAA) Servers. In this scenario, the BT Hubs 118A–B contain routing tables for all the nodes of the Bluetooth network 116 and the gateway 112.

The advantages of the present invention include increased capacity of both networks 100 and 116, reduced congestion and interference on both networks 100 and 116, increased coverage area for the devices 118A and 120A, increased battery life for the devices 118A and 120A, and reduced effective radiated power (ERP) requirements for the devices 118A and 120A. Further, the present invention provides a single device 118, 120 with access to multiple, heterogeneous, wireless networks 100, 116 for both voice and data communications in the office, at home, in vehicles, or any desired location.

For example, the BT Hub 118A and BTED 120A can use the Bluetooth network 116 exclusively when the cellular network 100 is unavailable or subject to interference, such as within a building or vehicle, thereby providing wireless local loop (WLL) services. By accessing the Bluetooth network 116 in a building or vehicle, the BT Hub 118A and BTED 120A offload usage from the cellular network 100.

On the other hand, the BT Hub 118A and BTED 120A can use the cellular network 100 exclusively when the Bluetooth network 100 is unavailable or subject to interference, such as outside a building or vehicle. By accessing the cellular network 100 in areas not serviced by a Bluetooth network 116, the BT Hub 118A and BTED 120A extend the normal range of such devices.

Handoffs Between Networks

When a BT Hub 118A or BTED 120A is communicating across either the Bluetooth network 116 and the cellular network 100, handoffs must be implemented. There are a number of ways handoffs can be performed.

In another embodiment, handoffs can be performed within the Bluetooth network 116 using location data, signal quality or signal strength. These handoffs are generally performed at the IP layer of the Bluetooth network 116. A discovery process is conducted at regular intervals by the BTEDs 120 to identify the closest BT Hub 118. A BTED 120 then communicates its position to the BT Hub 118, which in turn takes over responsibility for transmitting data to and from the BTEDs 120.

In one embodiment, the cellular network 100 performs handoffs by treating the BT Hub 118A as a pseudo BTS 106. In these situations, a handoff message is relayed from the BT Hub 118A to the BSC 104 through the BTS 106, and a handoff is performed in a manner similar to a normal handoff in the cellular network 100. Once it is out of the RF coverage area of the Bluetooth network 116, the BTED 120A will attempt to register with the cellular network 100 instead.

Figure 2:
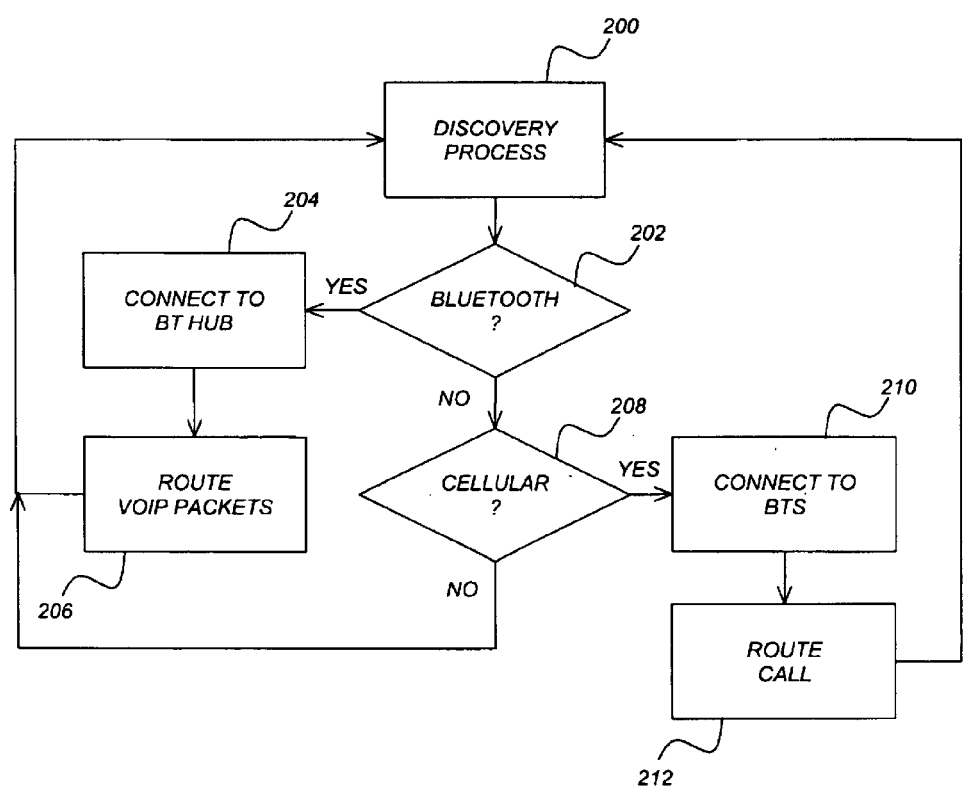
FIG. 2 is a flowchart that illustrates the logic performed during handoffs of dual-enabled devices according to the preferred embodiment of the present invention.

FIG. 2 is a flowchart that illustrates the logic performed during handoffs of dual-enabled BTEDs 120A according to the preferred embodiment of the present invention.

Block 200 represents a dual-enabled BTED 120A performing a discovery and/or registration process. Generally, the BTED 120A conducts a discovery process at regular intervals to identify the closest BT Hub 118 or BTS 106. Usually, the closest BT Hub 118 or BTS 106 is identified by signal strength, but it can be identified by other methods as well.

Block 202 is a decision block that determines whether the dual-enabled BTED 120A has identified a BT Hub 118 for use in communications, as well as discovery and registration. If so, control transfers to Blocks 204 and 206; otherwise, control transfers to Block 208. As noted, the dual-enabled BTED 120A first tries to connect to the Bluetooth network 116, before trying to connect to the cellular network 100.

Block 204 represents the dual-enabled BTED 120A connecting to the BT Hub 118A and Block 206 represents the BT Hub 118A routing the Voice-over-IP (VoIP) packets to the correct destination. In this embodiment, authentication, accounting and authorization are performed by the cellular network 100. Such services are implemented by converting messages in the Bluetooth network 116 to messages understandable by the cellular network 100 (e.g., IS-95 or GSM Air interfaces). Thereafter, circuit switched voice data is received and translated to IP packets by the BT Hub 118. The BT Hub 118 then routes the packets, either to another BTED 120, another BT Hub 118, the gateway 112, or the BTS 106, as required. In these steps, the BT Hub 118A either serves as a master device in a wireless local loop for communications to other BTEDs 118 in the Bluetooth network 116, or the BT Hub 118A communicates to the BSC 104 via the BTS 106 for communications through the cellular network 100, or the BT Hub 118A communicates via the gateway 112 through the cellular network 100 or the IP network 114 to some other device.

Block 208 is a decision block that determines whether the dual-enabled BTED 120A has identified a BTS 106 for use in communications, as well as discovery and registration. If so, control transfers to Blocks 210 and 212; otherwise, control transfers to Block 200.

Block 210 represents the dual-enabled BTED 120A connecting to the BTS 106, and Block 212 represents the BTS 106 routing the call from the dual-enabled BTED 120A to the correct destination. In these steps, the BTED 120A acts as a normal mobile phone in the cellular network 100.

In these various steps, routing tables may be maintained in each BT Hub 118, and/or the gateway 112, and/or the HLR 124, and/or the AAA Server 126, for use in correctly routing calls and/or VoIP packets. Moreover, load balancing can be performed by the cellular network 100 for itself and the Bluetooth network 116, by determining whether a dual-enabled device 118, 120 should use the Bluetooth network 116 or the cellular network 100, as required.

Handoffs occur at Block 200 when the dual-enabled BTED 120A identifies either a different closest BT Hub 118 or a BTS 106, as the situation may warrant. As noted in Blocks 202 and 208, the dual-enabled BTED 120A will prefer a BT Hub 118 over a BTS 106. In the preferred embodiment, handoffs between networks 100 and 116 should be seamless.

CONCLUSION

In summary, the present invention discloses a communications system that integrates a cellular network with a wireless local loop by means of devices enabled to operate on both networks.

The present invention defines a wireless network more extensive than current cellular networks and/or Bluetooth networks, since it combines and integrates both types of networks, which can be accessed by a single dual-enabled device. This allows the cellular system to offload some users to the Bluetooth system, which increases the current cellular system's coverage and capacity, as well as reducing interference. Advantages of the present invention include increased cellular and Bluetooth network capacity, reduced cellular and Bluetooth network interference, and increased cellular and Bluetooth network coverage area, since dual-enabled devices can access either or both networks, as needed.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for wireless communications, comprising:
   (a) a cellular network;
   (b) a wireless local loop network connected to the cellular network; and
   (b) a dual-enabled device enabled to operate on both the wireless local network and the cellular network, wherein the device uses the wireless local loop network for communications, if available, and otherwise uses the cellular network for communications, and wherein the dual-enabled device can ricochet data within the wireless local loop network to relay data for at least one device that is not cellular-enabled.

2. The system of claim 1, wherein a gateway connects the wireless local loop network to the cellular network.

3. The system of claim 1, wherein the wireless local loop network includes at least one master device that can communicate wirelessly with at least one slave device.

4. The system of claim 3, wherein the master and slave devices of the wireless local loop network form a logical connection, virtual local area network (LAN).

5. The system of claim 3, wherein the master device is cellular-enabled, so that it can communicate with the cellular network.

6. The system of claim 3, wherein the slave device is cellular-enabled, so that it can communicate with the cellular network.

7. The system of claim 3, wherein master or slave devices that are cellular-enabled can relay data for another master device or for slave devices that are not cellular-enabled.

8. The system of claim 1, wherein the wireless local loop network comprises a preferred network in areas where both the wireless local loop and the cellular network are available or where just the wireless local loop is available.

9. The system of claim 1, further comprising means for performing handoffs of the dual-enabled device between the wireless local loop network and the cellular network.

10. The system of claim 1, wherein the dual-enabled device further comprises means for performing a discovery and/or registration process to identify whether to use either the wireless local loop network or the cellular network.

11. A device for wireless communications, comprising a dual-enabled device enabled to operate on both a wireless local network and a cellular network, wherein the device uses the wireless local loop network for communications, if available, and otherwise uses the cellular network for communications, and wherein the dual-enabled device can ricochet data within the wireless local loop network to relay data for at least one device that is not cellular-enabled.

12. The device of claim 11, wherein a gateway connects the wireless local loop network to the cellular network.

13. The device of claim 11, wherein the wireless local loop network includes at least one master device that can communicate wirelessly with at least one slave device.

14. The device of claim 13, wherein the master and slave devices of the wireless local loop network form a logical connection, virtual local area network (LAN).

15. The device of claim 13, wherein the master device is cellular-enabled, so that it can communicate with the cellular network.

16. The device of claim 13, wherein the slave device is cellular-enabled, so that it can communicate with the cellular network.

17. The device of claim 13, wherein master or slave devices that are cellular-enabled can relay data for another master device or for slave devices that are not cellular-enabled.

18. The device of claim 11, wherein the wireless local loop network comprises a preferred network in areas where both the wireless local loop and the cellular network are available or where just the wireless local loop is available.

19. The device of claim 11, further comprising means for performing handoffs of the dual-enabled device between the wireless local loop network and the cellular network.

20. The device of claim 11, further comprising means for performing a discovery and/or registration process to identify whether to use either the wireless local loop network or the cellular network.

* * * * *